United States Patent [19]

Rath, Jr.

[11] Patent Number: 5,287,665
[45] Date of Patent: Feb. 22, 1994

[54] WATERPROOF FLANGED EXTERIOR WALL OUTLET SECURED TO A BUILDING FRAMEWORK

[76] Inventor: Robert Rath, Jr., 18412 Maria Pl., Cerritos, Calif. 90701

[21] Appl. No.: 860,886

[22] Filed: Mar. 31, 1992

[51] Int. Cl.⁵ .......................... E04F 17/08; H02G 3/08
[52] U.S. Cl. ...................................... 52/220.8; 52/27; 174/48; 220/3.3
[58] Field of Search ................. 174/48, 58; 52/27, 28, 52/220.1, 220.8; 220/3.2, 3.3, 3.5, 3.9

[56] References Cited

U.S. PATENT DOCUMENTS

| | | | |
|---|---|---|---|
| 4,265,365 | 5/1981 | Boteler | 220/3.3 |
| 4,296,870 | 10/1981 | Balkwill et al. | 220/3.3 |
| 4,673,097 | 6/1987 | Schuldt | 220/3.5 |
| 4,757,158 | 7/1988 | Lentz | 220/3.3 X |
| 4,794,207 | 12/1988 | Norberg et al. | 220/3.3 X |
| 4,952,754 | 8/1990 | Rye | 220/3.3 X |
| 5,133,165 | 7/1992 | Wimberly | 52/220.8 |

*Primary Examiner*—Peter Dungba Vo
*Attorney, Agent, or Firm*—Charles H. Thomas

[57] ABSTRACT

A flanged outlet, such as an electrical outlet box is provided for installation on an exterior wall of a building. The outlet has laterally enclosing walls the interior surfaces of which define an opening therewithin. The opening faces outwardly away from the exterior building wall. The box has a unitary integrally formed flat flange that extends laterally from the exterior surfaces of all of the walls about the entire perimeter of the outwardly facing opening. The flange is located behind the outlet opening. The flanged outlet can be employed in conjunction with upper and lower sheets of waterproof material, such as the waterproof black paper that is used to provide a moisture barrier in conventional building construction. A lower sheet of waterproof material resides between the flange of the outlet and an outwardly facing building surface and extends downwardly from beneath the outwardly facing opening of the outlet. An upper sheet of waterproof material is fastened to the outwardly facing building surface above the outlet flange. Moisture is thereby carried down the outer surfaces of the waterproofing sheets, and cannot penetrate to the interior of the building through openings defined therein to accommodate the outlet of the invention.

10 Claims, 4 Drawing Sheets

WATERPROOF FLANGED EXTERIOR WALL OUTLET SECURED TO A BUILDING FRAMEWORK

BACKGROUND OF THE INVENTION

1. Field of the Invention

The present invention relates to an outlet adapted for installation on an exterior wall of a building wherein the outlet has a unitary, integrally molded flat flange extending thereabout.

2. Description of the Prior Art

In the construction of buildings exterior wall outlets are frequently required. Such outlets are typically formed to house electrical sockets which are accessible from the outside of a building. Other types of outlets, such as plumbing hose bibs, dryer vents, and the like are also provided.

Conventional commercial and residential structures typically have outer walls formed of stucco, wood siding, shingle siding, aluminum siding or brick. Although building walls are constructed with the objective of creating a wind proof and water tight structure, very frequently a certain amount of precipitation can penetrate the outer structures of the walls, such as through cracks between siding boards or panels and by porous seepage through stucco.

To waterproof a building during the initial building construction the framework of the building is normally swathed with overlapping horizontally oriented strips of a waterproofing material, such as construction grade black paper. This black paper does provide a waterproof barrier or skin within the confines of the outer wall structure and is designed to provide an impenetrable barrier to precipitation. However, in order to provide access from outside the building to external wall outlets holes must be cut in the black paper. Each such hole represents a possible source of water penetration into the interior of the building at the location of each exterior wall outlet.

A conventional exterior outlet has the disadvantage of not being waterproof. For example, stucco is somewhat porous so that water can seep in behind the stucco and run down the outer surface of the horizontally overlapping layers of waterproof black paper. The black paper keeps the water from entering the interior of the building structure until the water reaches an opening in the black paper which has been cut to accommodate an exterior wall outlet. At that location water dripping down the outside of the black paper drops onto the top of an outside wall outlet and can flow across the top of that outlet structure inwardly toward the interior wall. In a standard exterior wall outlet box the water drips off of the black paper and runs inwardly, generally horizontally along the top of the outside outlet, and seeps into the interior of the building. The interior walls of the building are thus subjected to water damage, and significant safety hazards are created. For example, if the water enters an electrical outlet box it can create a short circuit and the danger of either fire or electrical shock.

SUMMARY OF THE INVENTION

The present invention involves a self flashing exterior wall outlet, such as an electrical outlet box. According to the invention such a wall box is formed of extruded or molded plastic which includes a unitary flange that extends laterally outwardly on all walls of the box, generally parallel to the plane of the outwardly facing opening of the box. The flange is spaced inwardly approximately three quarters of an inch from the exposed edges of the walls of the box that form the opening in the outlet.

In one broad aspect the present invention may be considered to be an outlet box adapted for installation on an exterior wall of a building comprising a structure formed with laterally enclosing walls having interior and exterior surfaces. The interior surfaces of the walls define an opening therewithin facing outwardly away from the exterior building wall. The outlet of the invention also includes a unitary, integrally formed flat flange that extends laterally from the exterior surfaces of all of the walls about the entire perimeter of the outwardly facing opening and behind the opening. That is, the flat flange is recessed inwardly toward the interior of the building from the plane of the exposed edges of the walls forming the opening.

By utilizing the integrally molded flanged outlet box of the invention a barrier is provided which prevents water from seeping into the interior of the building. Unlike conventional exterior wall outlets, there is no flat, generally horizontal surface that extends continuously from the exterior extremity of the outlet box at the outwardly facing opening into the interior of the building. To the contrary, the integral flange disrupts this surface and serves as a transverse moisture barrier which does not allow water to flow or stream across the top or walls of the outlet inwardly toward the wallboard or plaster interior walls of the building. Rather, the integral flashing of the wall outlet only allows water to flow downwardly. By properly arranging the layered sheets of waterproof material that are normally utilized to provide moisture protection to a building in conjunction with the outlet box of the invention, all of the water can be directed out away from the interior wall of the building.

In one embodiment of the invention the structure of the outlet is formed as a box having walls and a back, each with an interior surface and an exterior surface, whereby the interior surfaces of the walls and the back define a concave receptacle and the opening faces outwardly away from the back. The flange preferably has at least one aperture therethrough which is adapted to receive a fastener for mounting the flange. The flange is typically secured by nails through a plurality of such apertures to a building framework.

In another broad aspect the invention may be considered to be a combination of articles employed in building construction. Specifically, the combination of the invention includes a building framework having an outwardly facing surface and an outlet box fastened to the outwardly facing surface of the building and formed as a unitary structure with laterally enclosing walls having interior and exterior surfaces and a back with an interior surface and an exterior surface. The interior surfaces of the walls and the back define a concave receptacle with an opening therein facing outwardly away from the back. The outlet box is further comprised of an integrally formed flat flange that extends laterally from the exterior surfaces of all of the walls about the entire perimeter of the outwardly facing opening. The flange is located between the opening and the back of the outlet box.

The combination of the invention further includes a lower sheet of waterproof material disposed beneath the outwardly facing opening in the box and extending below the flange. This lower sheet is located between the flange of the box and the outwardly facing building surface. The combination also includes an upper sheet of waterproof material fastened to the outwardly facing building surface above the flange and overlying the flange and extending below the outwardly facing opening of the box. This upper sheet defines and opening at the opening of the box so as to leave the outwardly facing opening of the box uncovered.

The opening in the outlet structure normally has a rectangular configuration and the flat flange includes a planar portion which extends both above and below the opening in the structure. In one embodiment of the invention the flange is planar throughout both above, below, and to both sides of the opening in the concave receptacle. The flange may include apertures to receive nails or other fasteners to secure the flange to the building framework. These apertures are normally located to one side of the outwardly facing opening of the concave receptacle.

To achieve a weather tight seal with this embodiment of the invention, a horizontal strip of sisal craft paper is inserted up between the flange and the building framework beneath the level of the receptacle opening before the flange is secured to the building framework. The lower portion of this horizontal strip of sisal craft paper forms a flap that extends downwardly from behind the flange beyond and beneath the lower extremity of the flange. The sisal craft paper is flexible so that a lower, horizontal layer of black paper can be inserted up behind it on the inward or interior side thereof.

Next, an upper strip of black paper is layered horizontally across the flanged receptacle. A rectangular opening is cut in the upper strip of black paper so as to accommodate the outwardly protruding portion of the receptacle which extends outwardly beyond the flange. Since the outlet has an integral, unitary flange formed therewith, any water seeping down behind the stucco or siding on the outwardly facing surface of the upper layer of black paper cannot seep inwardly toward the interior building wall at the outlet, but is channeled laterally by the flange so that the water ultimately drips down on to the sisal craft paper, and cascades on down the horizontally disposed strips of black paper located therebeneath.

In an alternative embodiment of the invention the flat flange includes a planar portion which extends both above and below the outwardly facing opening in the structure of the outlet. The flange is further formed with a mounting pad, the back of which is recessed from the planar portion. The front or outwardly facing surface of the mounting pad is co-planar with the remaining portion of the flange. However, the back of the mounting pad is stepped back from the otherwise planar structure of the flange and resides in a plane closer to the back of the outlet than is the remainder of the flange. At least one and preferably several apertures are defined on the mounting pad. The mounting pad is typically a generally rectangular shaped portion of the flange having holes for nailing therethrough. The mounting pad may be recessed about one eighth of an inch inwardly from the remaining portion of the flange.

The back of the mounting portion of the flange resides in contact directly against an outwardly facing surface of the building framework, which may, for example, be an outwardly facing surface of a wall stud. Nails are driven through the apertures in the mounting pad. Because the back of the nailing surface is recessed behind the remainder of the flange, there is about a one eighth inch gap between the remainder of the flange and the outwardly facing surface of the wall stud. This gap is sufficient to allow a lower horizontal strip of waterproof black paper to be inserted upwardly from beneath in behind the portion of the flange beneath the mounting pad even after the outlet has been secured by nails to a stud. The one eighth inch clearance behind the flange allows the black paper to be inserted in between the flange and the stud from beneath the flange.

A rectangular opening is cut in the next highest layer or strip of black paper that is installed above the lower strip. This upper strip of black paper is disposed in direct contact against the outwardly facing surface of the flange. A rectangular opening is cut in the upper strip to accommodate the outwardly protruding portion of the outlet that extends beyond the flange. This upper strip of black paper is lapped outwardly and over the entire flange, except at the opening therein, and over the upper portion of the lower black paper strip.

In this arrangement water that seeps inwardly through the stucco or siding is again prevented from entering the interior of the building due to the flange formed on the outlet. Specifically, water seeping inwardly from the outer wall will drip down the outside of the black paper onto the outwardly extending portion of the outlet that protrudes beyond the black paper. However, the water cannot flow inwardly since it is blocked from doing so by the transverse integral flange on the outlet structure. Ultimately, the water will flow laterally down the black paper and will be channeled outwardly onto the outer surface of the next lower layer of black paper. The flange thereby prevents the water from flowing inwardly toward the interior of the building.

The invention may be described with greater clarity and particularity with reference to the accompanying drawings.

DESCRIPTION OF THE EMBODIMENT

Figure 1:
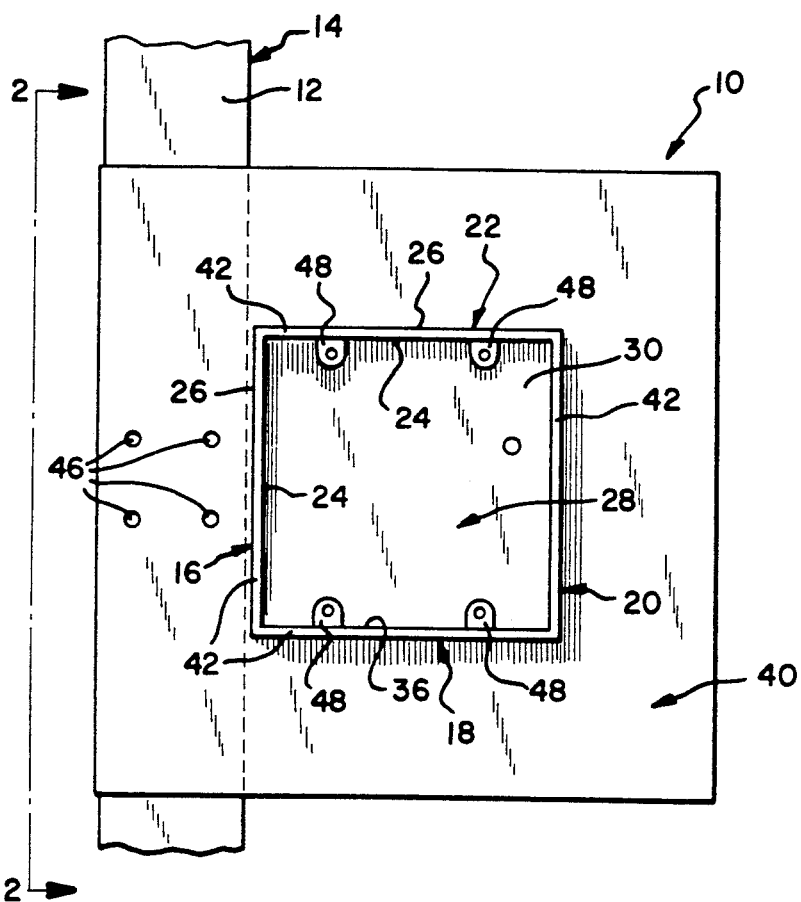
FIG. 1 a front elevational view showing one embodiment of an outlet according to the invention positioned for attachment to a building framework.
Figure 2:
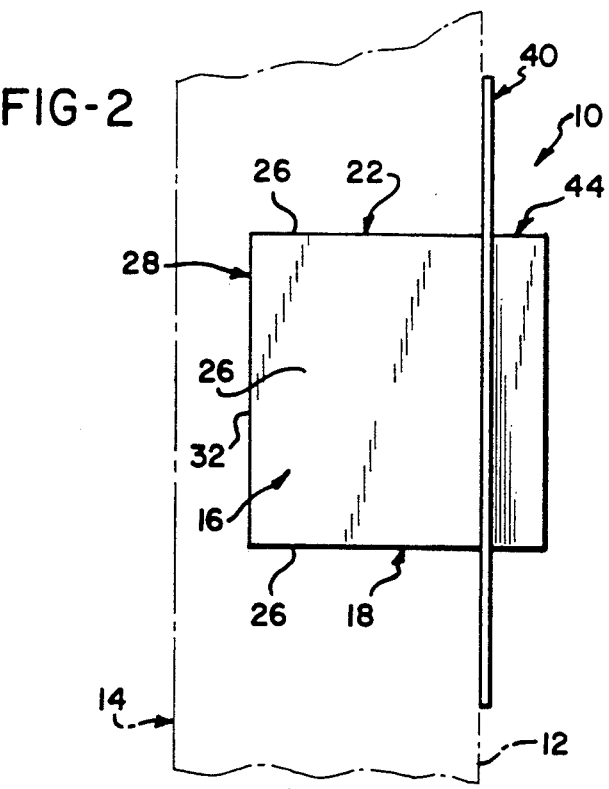
FIG. 2 is a side elevational view taken along the lines 2—2 of FIG. 1 with the building framework shown in phantom.

FIG. 1 illustrates an electrical outlet box 10 constructed according to the invention. The electrical outlet box 10 is adapted for installation on an exterior wall of a building. The outlet box 10 is shown disposed for mounting on the outwardly facing surface 12 of an upright wooden stud 14 of the type employed in conventional residential and commercial building construction. The electrical outlet box 10 is a unitary structure formed completely of extruded or molded plastic, such as polyvinyl chloride. The structure of the outlet box 10 is formed with rectangular, laterally enclosing walls 16, 18, 20 and 22 which are oriented at right angles to form a rectangular prism. The walls 16, 18, 20 and 22 each have an interior surface 24 and an exterior surface 26. The plastic structure of the outlet box 10 also includes a back 28 that extends transversely across the interior ends of the walls 16, 18, 20 and 22. The back 28 has a flat interior surface 30 and an opposite flat exterior surface 32. The terms interior as used to describe the surfaces 24 and 30 are used with respect to the concave receptacle 34 that is formed by the confining surfaces 24 and 30, and the term exterior refers to the opposite surfaces of the wall 16, 18, 20 and 22 and the back 28.

The concave receptacle 34 has an opening 36 defined by the interior surfaces 24 of the walls 16, 18, 20 and 22 at the exposed edges 42 thereof. The opening 36 faces outwardly away from the back 28 and outwardly with respect to the exterior wall of a building.

The outlet 10 has an integrally molded flat flange 40 that extends laterally from the exterior surfaces 26 of all of the walls 16, 18, 20 and 22 about the entire perimeter of the outwardly facing opening 36. The outer perimeter of the flange 40 has a rectangular configuration, and is formed as a unit with the outlet walls 16, 18, 20 and 22 and the outlet back 28, so that there is no interstitial gap through which moisture can seep between the flange 40 and the exterior surfaces 26 of any of the outlet walls 16, 18, 20 and 22.

Figure 5:
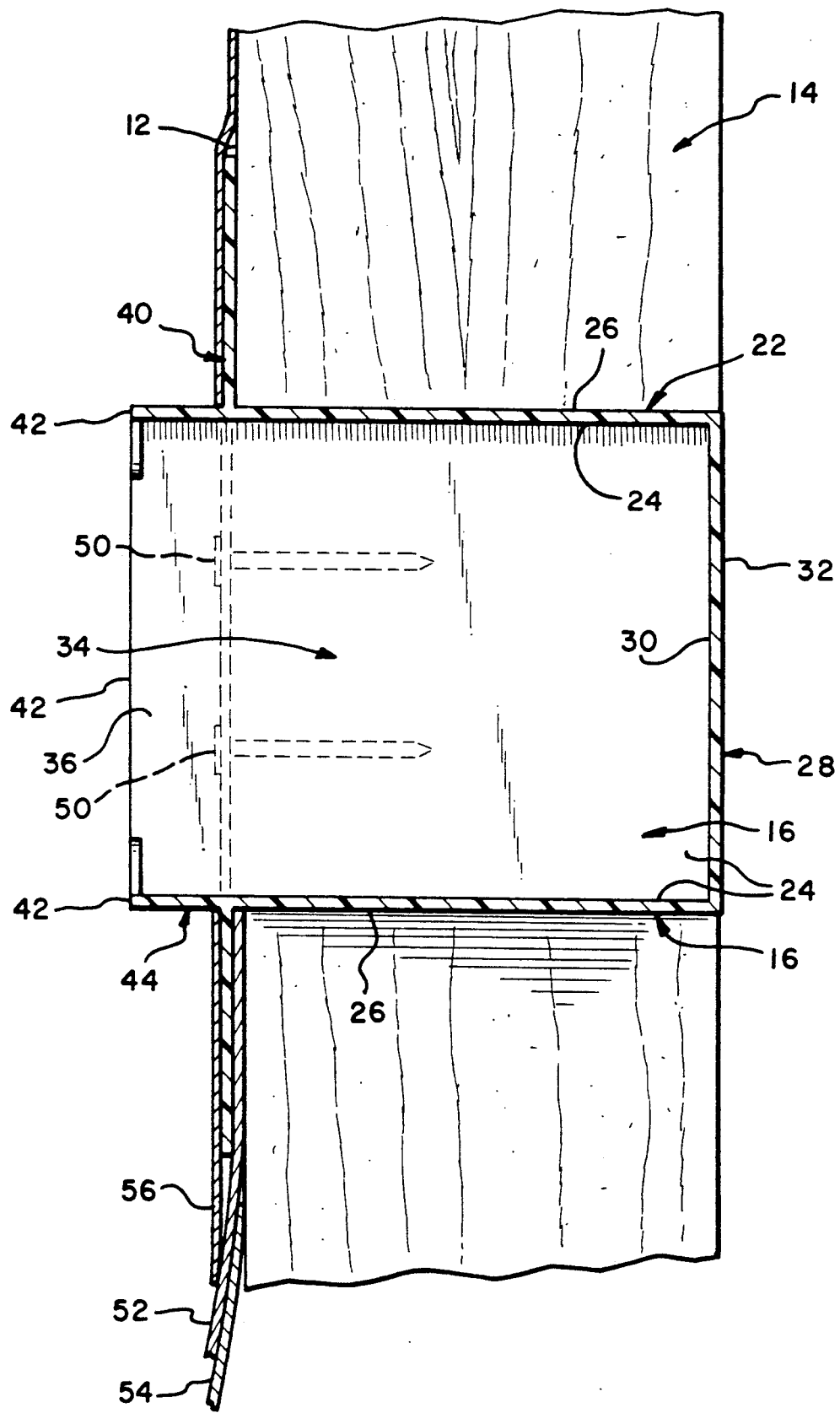
FIG. 5 is a side elevational sectional view taken along the line 5—5 of FIG. 4.

As best depicted in FIG. 5, the flange 40 is located behind the opening 36. That is, the flange 40 is located closer to the outlet box back 28 then are the exposed edges 42 of the outlet box walls 16, 18, 20 and 22. The outwardly directed portion of the walls 16, 18, 20 and 22 which projects beyond the flange 40 is indicated generally at 44 and is about three quarters of an inch in width. With this construction the edges 42 are about three quarters of an inch distant from the flange 40.

As illustrated in FIG. 1, the flange 40 has four small apertures 46 located to one side of the opening 36 of the outlet box 10. The entire flange 40 resides in a single plane spaced about three quarters of an inch from the exposed edges 42 of the outlet walls 16, 18, 20 and 22. Conventional tapped socket mounting tabs 48 extend inwardly from the interior surfaces 24 of the upper and lower opposing walls 18 and 22 of the outlet box 10. The socket mounting tabs 48 are tapped to receive conventional screws for holding electrical socket fixtures in place in the opening 36 of the receptacle 34.

Figure 3:
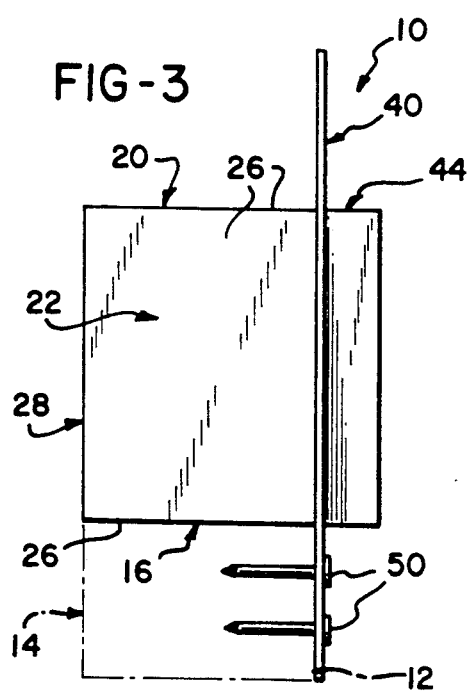
FIG. 3 is a top plan view of the outlet of FIG. 1.
Figure 4:
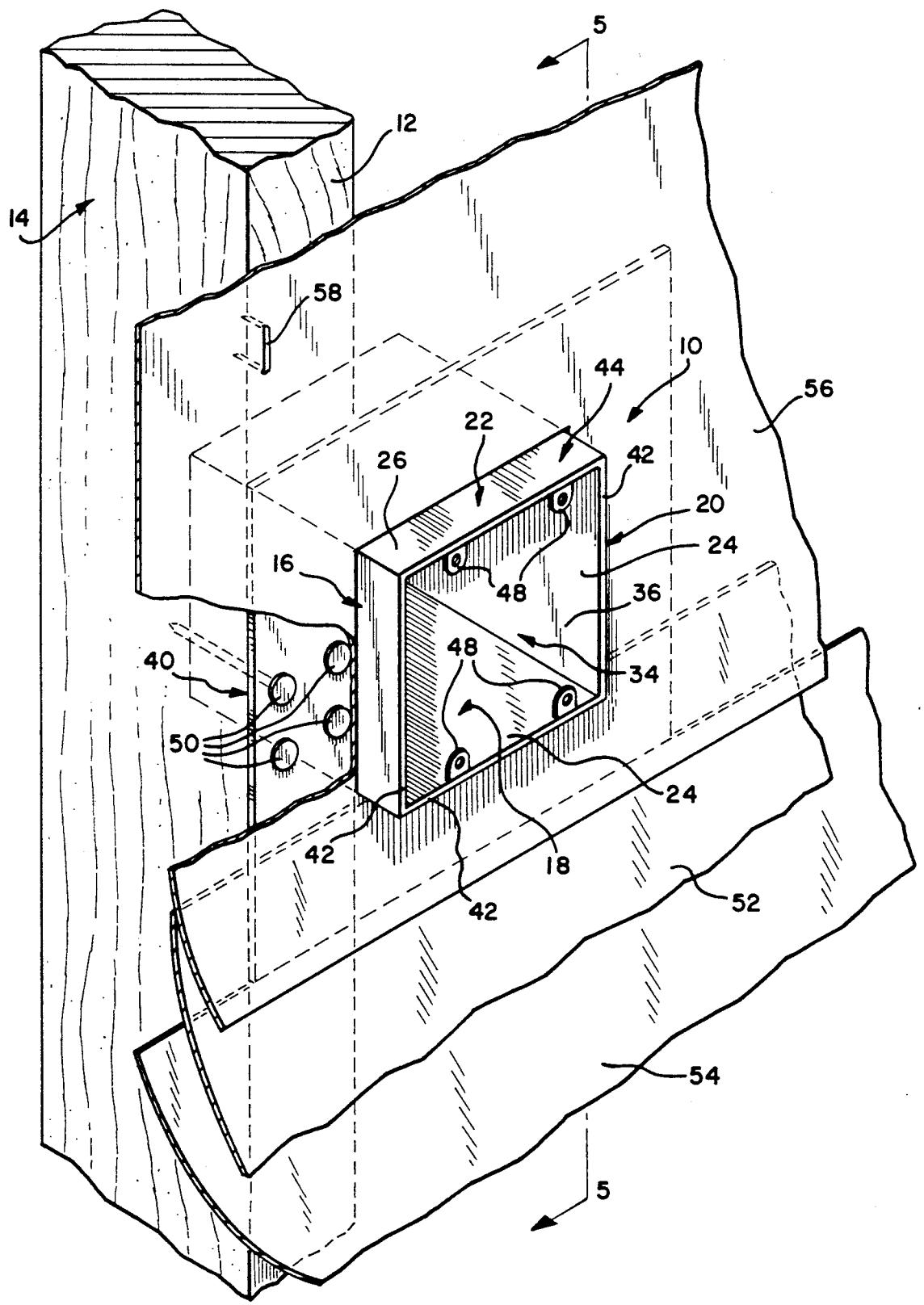
FIG. 4 is a perspective view showing the outlet of FIG. 1 in combination with the building framework and with upper and lower sheets of waterproof material.

As illustrated in FIGS. 3 and 4, the flanged outlet box 10 is secured in position against the face 12 of a stud 14 that faces outwardly toward the exterior wall of a building. The outlet box 10 is secured by means of four nails 50 which are driven through the apertures 46 in the flange 40. Before pounding in the nails 50, however, a horizontal strip of sisal craft paper 52, depicted in FIGS. 4 and 5, is inserted up underneath the lower portion of the flange 40 into abutment with exterior surface 26 of the lower wall 18 of the outlet box 10. The sisal craft strip 52 is interposed between the structure of the flange 40 and the outwardly facing surface 12 of the stud 14. The sisal craft strip 52 extends from the exterior surface 26 of the lower wall 18 of the outlet box 10 well below the lower extremity of the flange 40, thus leaving an exposed, flexible waterproof flap. The sisal craft strip 52 thereby forms a lower sheet of waterproof material disposed beneath the outwardly facing opening 36 in the outlet box 10 and extends below the flange 40. Once the nails 50 are driven through the apertures 46, the sisal craft strip 52 is clamped immovably between the flange 40 and the stud 14.

Subsequent to the time that the outlet box 10 is mounted on the stud 14, the exterior of the building is swathed with overlapping, horizontally extending strips of construction grade waterproof black paper. These strips are installed by nails or staples proceeding from the foundation of the building upwardly to the roof.

The strip 54 of waterproof black paper immediately beneath the outlet box 10 is inserted up underneath the lower edge of the exposed flap of the sisal craft strip 52 that depends downwardly beneath the lower extremity of the flange 40. This lower strip 54 of black paper is inserted between the sisal craft strip 52 and the outwardly facing surfaces 12 of the studs 14 comprising the building framework.

The next highest strip of waterproof black paper is indicated at 56. This horizontally extending strip serves as an upper sheet of waterproof material that is fastened to the outwardly facing surfaces 12 of the building studs 14 above the flange 40 by staples 58, as indicated. The upper waterproof sheet 56 overlies the flange 40 from above its upper extremity to beneath its lower extremity. The upper waterproof sheet 56 thereby extends below the outwardly facing opening 36 of the outlet box 10. To accommodate the outlet box opening 36, a knife is used to cut a rectangular opening in the lower edge of the upper waterproof sheet 56 so that the portion 44 of the outlet box 10 protrudes through the rectangular opening defined in the upper sheet 56. This leaves the outwardly facing opening 36 of the outlet box 10 uncovered, as depicted in FIGS. 4 and 5.

Subsequent to the installation of the waterproof sheets on the exterior of the building, including the waterproof sheets 54 and 56, the outer surface of the building is faced with some finishing material, such as stucco or siding, typically between about one half and three quarters of an inch in thickness. The outside finish of the building has been omitted from the drawings for clarity of illustration of the invention, although it is to be understood that this finishing material extends laterally on all sides of the portion 44 of the outlet box 10 that extends outwardly beyond the flange 40. The opening 36 in the concave receptacle 34 is thereby substantially flush with the outer surface of the building wall.

When water seeps in behind the outer surfacing material of the building wall, it can penetrate as far as the outer surface of the black paper sheets 52 and 56. Moisture reaching the black paper sheets will drip down the outside surface of the upper sheet 56 onto the exterior surface 26 of the top wall 22 of the outlet box 10. The moisture cannot flow inward toward the interior of the building, however, because it is blocked by the integral, vertically oriented flange 40. Instead, any water reaching the surface 26 of the top wall 22 flows laterally and drips down the exterior sides 26 of the lateral walls 16 and 20. Still, the moisture cannot penetrate inwardly, however, since the flange 40 extends around the entire circumference of the receptacle opening 36. Therefore, the water continues to drip down the outer surface of the upper sheet 56 and cascades downwardly onto the waterproof sisal craft strip 52, and then down onto the outer surface of the lower black paper sheet 54.

Moisture that has penetrated the outer wall of the building continues to cascade downwardly on the outer surface of the waterproof covering provided by the sequential, overlapping black paper strips, and cannot enter the interior of the building through any opening therein defined to accommodate the receptacle box 10. It can therefore be seen that the outlet box 10 of the invention, installed in combination with the sisal craft strip 52 and black paper sheet 56, prevents water from seeping into the interior walls of the building.

Figure 6:
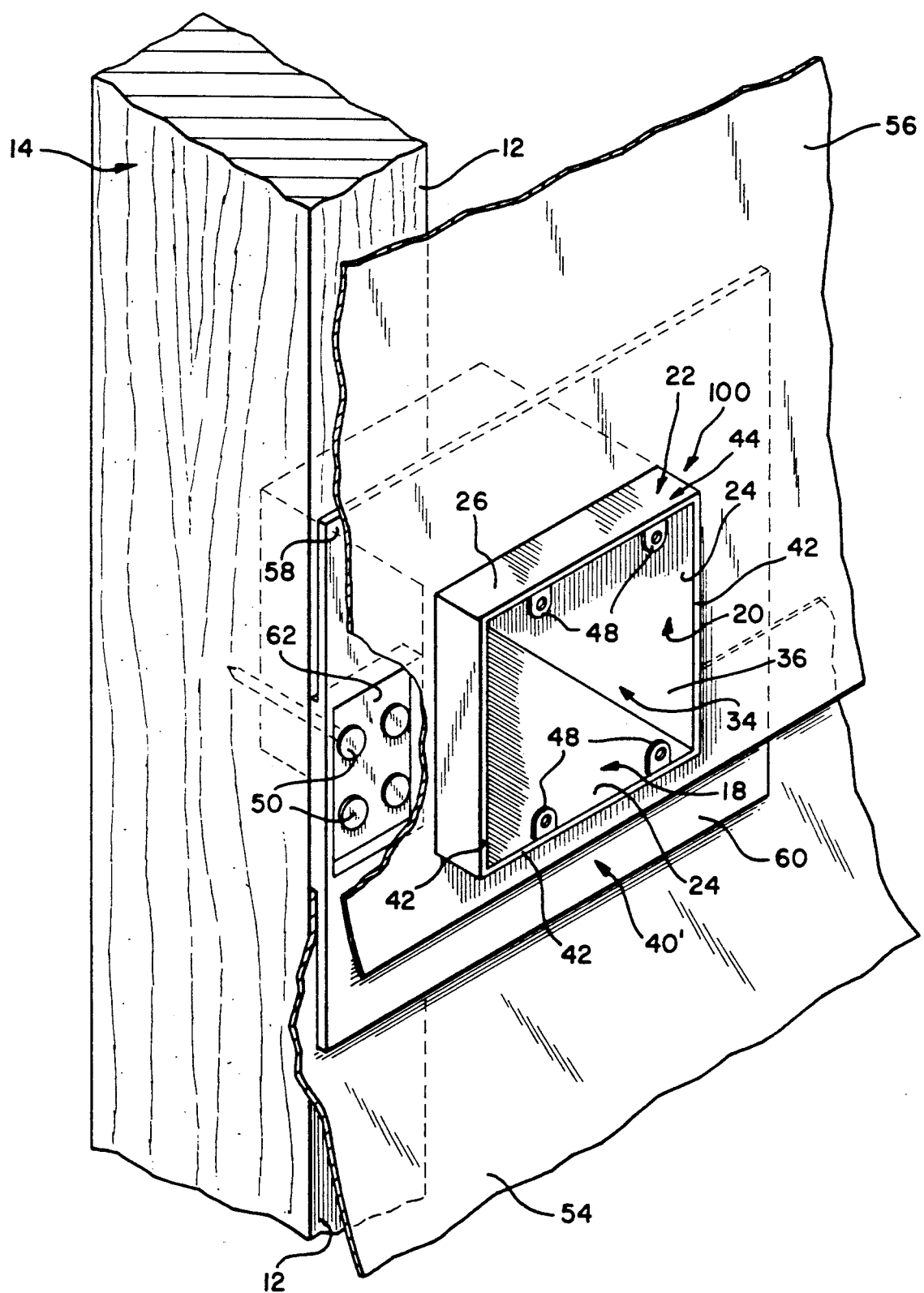
FIG. 6 is a perspective view of an alternative embodiment of an outlet arranged in combination with a building frame and upper and lower waterproof sheets according to the invention.

FIG. 6 illustrates an alternative embodiment of the invention. In the embodiment of FIG. 6 the outlet box 100 is constructed very similarly to the outlet box 10, and common components and surfaces thereof are designated by like reference numbers. The flange 40' of the outlet box 100 differs from the flange 40, however, in that although the flange 40' is flat, it does not reside in a single vertical plane throughout. Rather, the flange 40' includes a planar portion which extends both above the opening 36 in the outlet box 100, where indicated at 58 in FIG. 6, and below the opening 36 where indicated at 60. A portion 62 of the flat flange 40' to one side of the outlet receptacle opening 36 is thicker than the remainder of the flange 40'. The outwardly facing surface of the portion 62 is co-planar with the remaining portion of the outwardly facing surface of the flange 40'. However, the back of the portion 62 projects inwardly from the upper and lower portions 58 and 60 of the flange 40'. The back surface of the portion 62 is recessed about one eighth of a inch from the plane of the back surface of the upper and lower portions 58 and 60 of the flange 40' in a direction closer to the back 28 of the outlet box 100 than are the portions 58 and 60. The thickest portion 62 serves as a fastening or mounting pad for securing the outlet box 100 to the outwardly facing surface 12 of the upright stud 14, as depicted. The fastening pad 62 is secured by nails 50 in the same manner employed to secure the outlet box 10 to the upright stud 14, as described in conjunction with FIGS. 1-5.

The difference in the installation of the outlet box 100 from that of the outlet box 10 is that with the outlet box 100 a gap of about one eighth inch exists between the outwardly facing surface 12 of the stud 14 and the upper flange portion 58 and the lower flange portion 60 of the flange 40'. As a result of this arrangement the outlet box 100 can be nailed to the stud 14 without any sisal craft strip such as the sisal craft strip 52 depicted in FIG. 4. Rather, the upper edge of the lower sheet 54 of black paper can be inserted upwardly into the gap between the stud surface 12 and the lower portion 40 of the flange 40' even after the flange 40' has been fastened by nails 50 to the stud 12, as depicted in FIG. 6. The black paper sheet 54 is thereby disposed beneath the outwardly facing opening 36 in the outlet box 100 and extends below the flange 40'. It is the lower black paper sheet 54 which is located between the lower portion 60 of the flange 40' of the outlet box 100 and the outwardly facing building stud surface 12. The lower black paper sheet 54 is fastened to the stud 14 by nails or staples in a conventional manner.

The next highest upper sheet 56 of black paper is likewise nailed or stapled to the outwardly facing building stud surface 12 above the upper portion 58 of the flange 40'. The upper sheet 56 extends downwardly and overlies the upper portion 58 of the flange 40'. The upper black paper sheet 56 extends below the outwardly facing opening 36 of the box 100. As with the embodiment of FIGS. 1-5 a rectangular opening is defined in the black paper sheet 56 at the opening 36 of the outlet box 100 so as to leave the outwardly facing opening 36 of the outlet box 100 uncovered.

Any moisture that penetrates the outer wall of the embodiment of FIG. 6 flows down the outer surface of the upper black paper sheet 56 onto the outwardly protruding portion 44 of the outlet box 100. As with the embodiment of FIGS. 1-5, the flange 40' prevents moisture from seeping inwardly toward the interior building wall. Rather, the moisture flows laterally across the upper surface 26 of the top wall 22 of the outlet box 100 and down the outer surface of the upper black paper sheet 56. The moisture will drip from the lower extremity of the upper black paper sheet 56 onto the lower portion 60 of the flange 40'. Because the entire outlet box 100 is formed of molded or extruded plastic, it will not rust or deteriorate with water contact. The moisture then drips from the lower portion 60 of the flange 40' onto the outer surface of the lower black paper sheet 54, and on down the outside of the black paper strips therebelow.

It can be seen that with either embodiment of the invention moisture is precluded from seeping inwardly through openings in the black paper sheets which are formed to accommodate outlets, such as the electrical outlet boxes 10 and 100 depicted in the drawings.

It is to be understood that the back of the outlet box of the invention does not necessarily need to be flat. To the contrary, it can be curved, irregular, or any other shape. There will normally be openings at the rear of the outlet box, and possibly openings in the walls thereof, to allow wires to enter the box. The outlet box may also be provided with fasteners for securing the wires in place. In addition, there may be a grounding point in the form of a threaded opening at the rear of the outlet box.

Also, the opening of the outlet box need not necessarily be rectangular. Some outlet boxes have walls which are cylindrical in configuration, thereby defining a circular opening. The walls of still other outlet boxes may be octagonal. Therefore, the invention may be employed with an outlet box having virtually any opening shape.

Also, the utility of the invention is not limited to electrical outlet boxes. Indeed, the invention is equally applicable to plumbing outlets as well. For example, the invention could take the form of a hollow pipe coupling having a unitary, integrally formed flange extending laterally outwardly about its entire perimeter. Other embodiments of the invention are also possible, and numerous variations and modifications of the invention will undoubtedly become readily apparent to those familiar with building construction. Accordingly, the scope of the invention should not be construed as limited to the specific embodiments depicted and described, but rather is defined in the claims appended hereto.

I claim:

1. A combination of a building framework having an outlet box secured thereto comprising:
   (a) a building framework having an outwardly facing exterior building framework surface,
   (b) an outlet box fastened to said building framework at said outwardly facing exterior building framework surface and formed as a unitary structure with laterally enclosing walls having interior and exterior surfaces and with a back having an interior surface and an exterior surface, said interior surfaces of said walls and said interior surface of said back defining a receptacle wherein said walls have exposed edges remote from said back which form an open mouth of said receptacle, said open mouth facing outwardly away from said back, said exterior surfaces of said walls defining an outer perimeter of said receptacle, said outlet box further comprising an integrally formed flat flange that extends laterally from said exterior surfaces of all of said walls entirely about said outer perimeter of said receptacle and wherein said flange is located between said exposed edges of said walls and said back, (c) a lower sheet of waterproof material disposed beneath said outwardly facing open mouth of said receptacle and extending downwardly below said flange and located between said flange of said box and said outwardly facing exterior building framework surface, and (d) an upper sheet of waterproof material fastened to said outwardly facing exterior building framework surface above said flange and overlying said flange and extending below said outwardly facing open mouth of said receptacle, said upper sheet of waterproof material having an opening therein surrounding said open mouth of said receptacle so as to leave said outwardly facing open mouth of said receptacle uncovered.

2. The combination according to claim 1 wherein said outlet box has a rectangular configuration.

3. The combination according to claim 2 wherein said upper sheet of waterproof material is construction grade black paper.

4. The combination according to claim 2 wherein said flange has portions above and below said open mouth of said receptacle which reside in mutually coplanar relationship outset from said outwardly facing surface of said building framework and an intermediate portion that is recessed therefrom toward said back of said receptacle and which resides in contact with and is fastened to said outwardly facing surface of said building framework.

5. The combination according to claim 4 wherein said lower sheet of waterproof material is sisal craft paper.

6. The combination according to claim 2 wherein said flange is parallel to said back and both said upper and lower sheets of waterproof material are formed of construction grade black paper.

7. A combination of a building framework having an outlet box secured thereto comprising:

(a) a molded outlet box structure with a back having an interior surface and an exterior surface and laterally enclosing walls having interior and exterior surfaces and projecting from said back to define exposed edges remote from said back, whereby said interior surfaces of said walls and said back define a receptacle and said exposed edges of said walls surround and define a receptacle opening facing outwardly away from said back, and wherein said exterior surfaces of said enclosing walls define an outer perimeter of said receptacle, and said structure is also formed with a unitary, integrally molded flat flange that extends laterally from said exterior surfaces of all of said walls and is located between said back and said receptacle opening and said flange extends entirely about said outer perimeter of said receptacle opening intermediate said receptacle opening and said back such that said flange is closer to said back than are said exposed edges of said walls, (b) a building framework having an exteriorly facing surface to which said flange is secured such that at least a portion of said flange resides in contact with said framework and said receptacle opening is located outwardly from said flange at said exteriorly facing building framework surface, (c) a lower sheet of waterproof material secured between said flange and said exteriorly facing building framework surface and extending downwardly beneath said flange, and (d) an upper sheet of waterproof material secured to said exteriorly facing building framework surface and extending from above said flange downwardly past said receptacle opening, whereby said upper sheet overlies said flange above and on both sides of said receptacle opening.

8. The combination according to claim 7 wherein said flange is a planar structure throughout.

9. The combination according to claim 7 wherein said flange has upper and lower portions respectively extending above and below said receptacle opening in mutually coplanar relationship and an intermediate fastening region recessed from the plane of said upper and lower flange portions toward said back.

10. The combination according to claim 9 wherein said recessed fastening region of said flange is provided with apertures therethrough for receiving fasteners to secure said outlet box to said building framework.

* * * * *